United States Patent
Osumi et al.

(10) Patent No.: US 10,093,320 B2
(45) Date of Patent: Oct. 9, 2018

(54) DRIVE SUPPORT DEVICE FOR CONTROLLING DRIVE SUPPORT FUNCTIONS AND EVALUATING DRIVER PERFORMANCE

(71) Applicant: TOYOTA JIDOSHA KABUSHIKI KAISHA, Toyota-shi, Aichi-ken (JP)

(72) Inventors: Ryota Osumi, Nagoya (JP); Masato Endo, Nagakute (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 15/475,319

(22) Filed: Mar. 31, 2017

(65) Prior Publication Data

US 2017/0297583 A1    Oct. 19, 2017

(30) Foreign Application Priority Data

Apr. 14, 2016  (JP) .................................. 2016-081504

(51) Int. Cl.

| | |
|---|---|
| *G01M 17/00* | (2006.01) |
| *B60W 40/09* | (2012.01) |
| *G07C 5/00* | (2006.01) |
| *G07C 5/02* | (2006.01) |
| *G09B 19/16* | (2006.01) |
| *G01S 19/13* | (2010.01) |
| *G06Q 40/08* | (2012.01) |

(52) U.S. Cl.
CPC ............ *B60W 40/09* (2013.01); *G07C 5/008* (2013.01); *G07C 5/02* (2013.01); *G09B 19/167* (2013.01); *B60W 2540/30* (2013.01); *G01S 19/13* (2013.01); *G06Q 40/08* (2013.01)

(58) Field of Classification Search
CPC .......... B60W 40/09; G07C 5/008; G07C 5/02
See application file for complete search history.

(56) References Cited

U.S. PATENT DOCUMENTS

| | | | |
|---|---|---|---|
| 9,870,649 B1* | 1/2018 | Fields | G07C 5/008 |
| 2015/0104757 A1* | 4/2015 | Moncrief | G09B 9/302 434/38 |
| 2015/0211868 A1 | 7/2015 | Matsushita et al. | |
| 2016/0046298 A1* | 2/2016 | Deruyck | B60W 40/09 340/576 |

FOREIGN PATENT DOCUMENTS

| | | |
|---|---|---|
| JP | 2009-128486 A | 6/2009 |
| JP | 2010-000948 A | 1/2010 |
| JP | 2016-024595 A | 2/2016 |
| WO | 2014/013985 A1 | 1/2014 |

* cited by examiner

*Primary Examiner* — Adam M Alharbi
(74) *Attorney, Agent, or Firm* — Oliff PLC

(57) ABSTRACT

A drive support device includes a vehicle information obtainment unit configured to obtain vehicle information including a plurality of driving support levels provided by the drive support device installed in a vehicle, and a position of the vehicle or time; and a vehicle information recording unit configured to record the vehicle information obtained by the vehicle information obtainment unit on a vehicle information storage unit. The vehicle information recording unit records the position of the vehicle or the time, and the driving support level executed at the position of the vehicle or the time, on the vehicle information storage unit.

9 Claims, 10 Drawing Sheets

FIG.3

| LEVELS OF VEHICLE AUTOMATION BY NHTSA |
|---|
| LEVEL 0 (NO AUTOMATION):<br>THE DRIVER CONTROLS DRIVING<br>(STEERING, BRAKING, AND ACCELERATION) AT ALL TIMES. |
| LEVEL 1 (FUNCTION-SPECIFIC AUTOMATION):<br>STEERING, BRAKING, OR ACCELERATION IS SUPPORTED,<br>BUT NOT ALL OF STEERING, BRAKING,<br>AND ACCELERATION ARE SUPPORTED. |
| LEVEL 2 (COMBINED FUNCTION AUTOMATION):<br>THE DRIVER IS RESPONSIBLE FOR SAFE DRIVING,<br>THOUGH ALL OF STEERING, BRAKING,<br>AND ACCELERATION ARE SUPPORTED. |
| LEVEL 3 (LIMITED SELF-DRIVING AUTOMATION):<br>THE DRIVER PERFORMS DRIVING OPERATIONS BY HIMSELF ONLY<br>WHEN THE SITUATION GOES BEYOND THE FUNCTIONAL LIMIT. |
| LEVEL 4 (FULL SELF-DRIVING AUTOMATION):<br>THE DRIVER ENTRUSTS ALL DRIVING OPERATIONS<br>AND MONITORING ROADWAY CONDITIONS, TO THE SYSTEM. |

FIG.4

| LEVEL 0 | LEVEL 1 | LEVEL 2 | LEVEL 3 | LEVEL 4 |
|---|---|---|---|---|
| - | SAFETY WARNING | SAFETY WARNING | SAFETY WARNING | SAFETY WARNING |
| - | - | AUTOMATIC DECELERATION AUTOMATIC AVOIDANCE | AUTOMATIC DECELERATION AUTOMATIC AVOIDANCE | AUTOMATIC DECELERATION AUTOMATIC AVOIDANCE |
| - | - | - | AUTOMATIC ACCELERATION | AUTOMATIC ACCELERATION |
| - | - | - | - | AUTOMATIC STEERING |

DRIVE SUPPORT DEVICE FOR CONTROLLING DRIVE SUPPORT FUNCTIONS AND EVALUATING DRIVER PERFORMANCE

CROSS-REFERENCE TO RELATED APPLICATIONS

This application is based upon and claims the benefit of priority of the prior Japanese Priority Application No. 2016-081504 filed on Apr. 14, 2016, the entire contents of which are hereby incorporated by reference.

FIELD

The present disclosure relates to a drive support device.

BACKGROUND

Conventionally, a safe driving diagnosis system has been known that determines a safe driving level of the driver of a vehicle, to calculate a proper insurance premium in accordance with the safe driving level (see, for example, Patent document 1). This system determines that the safe driving level is low if driving support functions, such as a pre-crash safety function, are activated highly frequently, assuming that such activation implies a high risk of an accident.

Also, a drive support device has been known that includes a unit to obtain information about the driving support level and a unit to execute driving support depending on the obtained information about the driving support level (see, for example, Patent document 2).

RELATED-ART DOCUMENTS

Patent Documents

[Patent Document 1] Japanese Laid-Open Patent Application No. 2009-128486
[Patent Document 2] Japanese Laid-Open Patent Application No. 2010-000948

Progress in driving support technologies in recent years has brought accumulation of statistical knowledge about the vehicle safety such that if a drive support device executes driving support at a higher level, for example, fully automated driving specified by NHTSA (National Highway Traffic Safety Administration), the safety of the vehicle is high. The higher the driving support level executed by the drive support device becomes, the less the driver contributes to driving the vehicle.

However, conventional technologies do not take the driving support level into consideration, but uniformly determine that the risk of an accident is high if the driving support functions are activated highly frequently within a short period of time. Therefore, even if the driver has transferred command of driving the vehicle to the drive support device that executes the driving support at a higher level, an evaluation about driving by the driver may be downgraded.

To properly evaluate the driving of the driver who receives driving support from the drive support device, it is important to grasp what level of driving support has been executed by the drive support device at what positions or time.

In view of the above, it is an object of an aspect of the present invention to provide a drive support device with which it is possible to grasp what level of driving support has been executed by the drive support device at what positions or time.

SUMMARY

In order to achieve the above-mentioned object, according to an aspect of the present invention, a drive support device includes a vehicle information obtainment unit configured to obtain vehicle information including a plurality of driving support levels provided by the drive support device installed in a vehicle, and a position of the vehicle or time; and a vehicle information recording unit configured to record the vehicle information obtained by the vehicle information obtainment unit on a vehicle information storage unit. The vehicle information recording unit records the position of the vehicle or the time, and the driving support level executed at the position of the vehicle or the time, on the vehicle information storage unit.

According to this aspect, the vehicle information recording unit records the position of the vehicle or the time, and the driving support level at the position of the vehicle or the time, on the vehicle information storage unit. Therefore, by reading out the position of the vehicle or the time, and the driving support level at the position of the vehicle or the time, from the vehicle information storage unit, it is possible to grasp what level of driving support has been executed by the drive support device at what positions or time.

As a result, for example, it is possible to verify highly precisely in a situation where the drive support device executes the drive support for the vehicle, how much the driver contributes to driving the vehicle even if the degree of contribution of the driver to driving the vehicle changes while the driving support level is maintained at the same level.

Another aspect of the present invention is characterized by including a driver evaluation unit configured to evaluate driving of a driver of the vehicle based on the obtained vehicle information; and a driver evaluation recording unit configured to record an evaluation result by the driver evaluation unit on the driver evaluation storage unit.

According to this aspect, the driver evaluation unit evaluates the driving of the driver of the vehicle based on the obtained vehicle information, and the driver evaluation recording unit records an evaluation result by the driver evaluation unit on the driver evaluation storage unit. Therefore, by reading out the evaluation result by the driver evaluation unit from the driver evaluation storage unit, it is possible to obtain the evaluation result of the driver.

Another aspect of the present invention is characterized by the vehicle information that includes a situation of the vehicle other than the position of the vehicle or the time, and the driving support level.

According to this aspect, it is possible to provide the evaluation result of the driver to an external information service destination (e.g., an insurance company that provides a service using the evaluation result of the driver), without providing the vehicle information itself about the situation of the vehicle to the external information service destination. Therefore, the privacy can be prevented from leaking out due to providing the vehicle information about the situation of the vehicle to the outside, and the information service can be provided while taking the privacy into consideration.

Here, the "situation of the vehicle" includes a motional situation of the vehicle (acceleration, speed, and the like based on sensor values and calculated values); a control situation of the vehicle (activation commands, command values, set values, flags, and the like for controlling the vehicle); a traveling situation of the vehicle (the distance to a preceding vehicle based on sensor values and calculated values, traffic lanes, and the like); an operational situation of the vehicle (the opening of the accelerator, the amount of a brake operation, and the like based on sensor values); and an environmental situation of the vehicle (indoor temperature, outdoor temperature, presence of raindrops, and the like based on sensor values).

Since the "driving support level of the drive support device installed in the vehicle" is ever-changing data depending on the intention of the driver or the environment around the vehicle, it is one of the vehicle information items about the situation of the vehicle (more specifically, the control situation of the vehicle).

Another aspect of the present invention is characterized by the obtained vehicle information that includes activation information about an emergency avoidance function executed by the drive support device for supporting an emergency avoidance operation of the vehicle, and the driver evaluation unit that downgrades an evaluation of the driving of the driver less in a case where the drive support device has activated the emergency avoidance function at the driving support level being set higher, than in a case where the drive support device has activated the emergency avoidance function at the driving support level being set lower.

The higher the driving support level at which the drive support device executes the drive support, the higher the safety of the vehicle becomes. In other words, activation of the emergency avoidance function at a high level among the driving support levels can be considered as an operation by the drive support device 12 to raise the safety of the vehicle. Therefore, according to this aspect, it is possible to prevent that the evaluation of the driver unfairly falls down by activation of the emergency avoidance function at a high level among the driving support levels.

Since the "activation information about the emergency avoidance function" is information about whether the emergency avoidance function has been activated, it is one of the vehicle information items about the situation of the vehicle (more specifically, the control situation of the vehicle).

Another aspect of the present invention is characterized by the driver evaluation unit that evaluates higher the driving of the driver while the drive support device executes the driving support for the vehicle at a driving support level greater than or equal to a predetermined level for a period of time, in a case where the period of time is longer than in a case where the period of time is shorter.

In a situation where the drive support device executes the driving support for the vehicle at a predetermined level or greater among the driving support levels, the safety of the vehicle tends to be higher if the period of time is longer during which the driver transfers command of driving the vehicle to the drive support device. Therefore, according to this aspect, it is possible to properly evaluate the driving of the driver who transfers command of driving the vehicle to the drive support device that executes the driving support for the vehicle at the predetermined level or greater among the driving support levels. Also according to this aspect, it is possible to properly evaluate the driving of the driver, without continuing to record all information items of the vehicle for evaluating the driving of the driver. In other words, it is possible to avoid the necessary amount of information becoming enormous for an appropriate evaluation of the driving of the driver, and to reduce the necessary capacity of the storage device.

Another aspect of the present invention is characterized by the obtained vehicle information that includes information about driving operation by the driver of the vehicle, and the driver evaluation unit that evaluates the driving of the driver, based on the driving support level and the information about the driving operation.

Depending on the driving support level, the driver may need or may not need to perform an intervening operation. Therefore, the driver evaluation unit evaluates the driving of the driver based on the driving support level and the driving operation information, so as to evaluate whether it is appropriate to have the driver perform an intervening operation in the driving support by the drive support device.

Since "the information about a driving operation by the driver of the vehicle" is information about whether the driver has performed a driving operation, it is one of the vehicle information items about the situation of the vehicle (more specifically, the operational situation of the vehicle).

Another aspect of the present invention is characterized by the driver evaluation unit that evaluates, in a case where the driving support level is set to a level requiring a driving operation by the driver, the driving of the driver higher in a case where the driver performs the driving operation than in a case where the driver does not perform the driving operation.

According to this aspect, if the driver performs a driving operation when the drive support device executes the driving support at a comparatively low driving support level that requires a driving operation by the driver, the driving of the driver is evaluated higher. Therefore, it is possible to prompt the driver to perform an intervening operation that should be done.

Another aspect of the present invention is characterized by the driver evaluation unit that evaluates, in a case where the driving support level is set to a level not requiring a driving operation by the driver, the driving of the driver higher in a case where the driver does not perform the driving operation than in a case where the driver performs the driving operation.

According to this aspect, if the driver does not perform a driving operation when the drive support device executes the driving support at a driving support level that does not require a driving operation by the driver, the driving of the driver is evaluated higher. Therefore, it is possible to prevent the driver from performing an intervening operation unnecessarily if the drive support device executes the driving support at the driving support level that does not require a driving operation by the driver.

Thus, according to an aspect of the present invention, it is possible to grasp what level of driving support has been executed by the drive support device at what positions or time.

BRIEF DESCRIPTION OF DRAWINGS

FIG. 3 is a diagram illustrating an example of driving support levels of a drive support device;

FIG. 4 is a diagram illustrating another example of driving support levels of a drive support device;

DESCRIPTION OF EMBODIMENTS

In the following, embodiments will be described with reference to the drawings.

<Embodiment of Driver Evaluation System>

Figure 1:
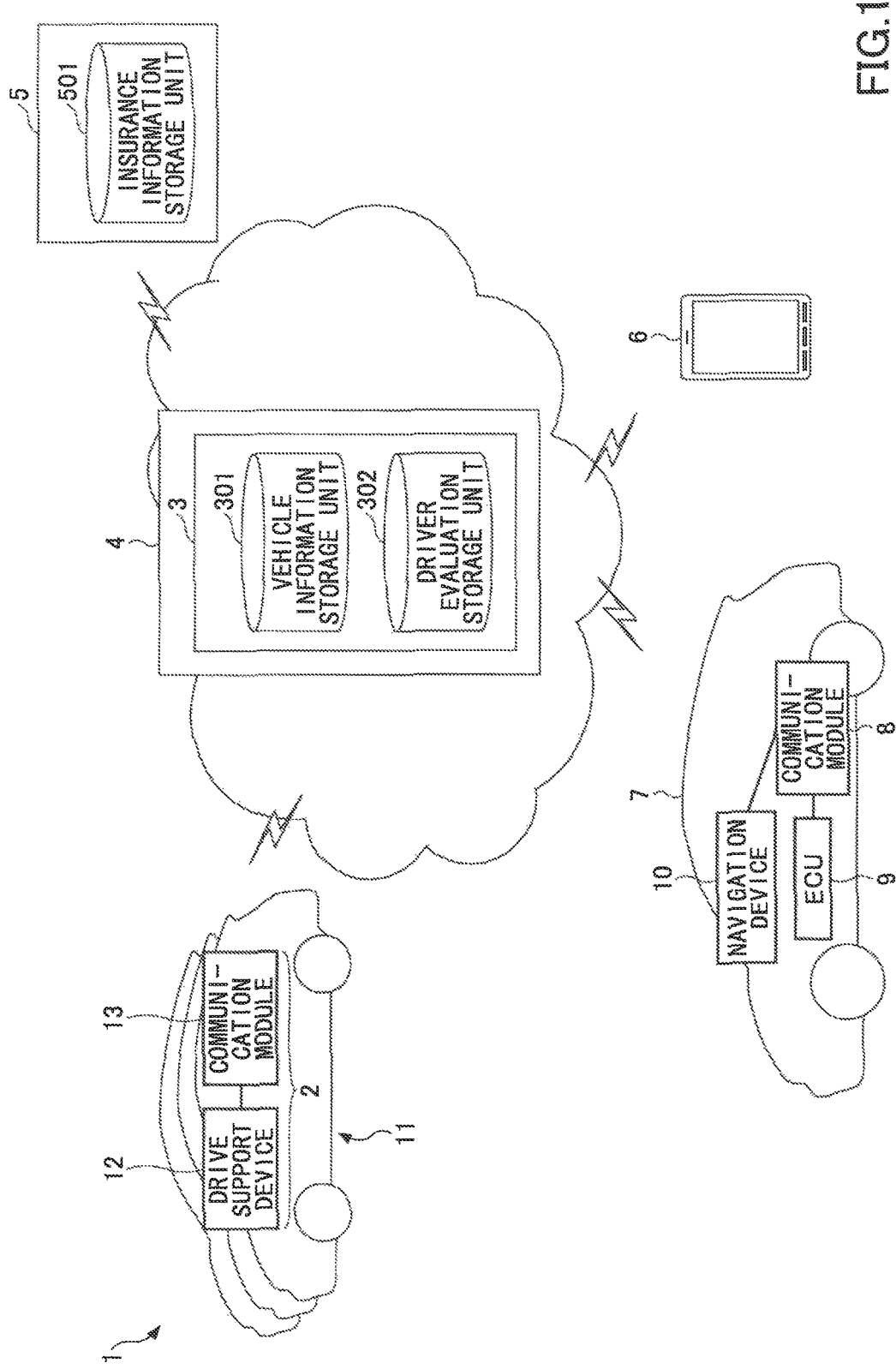
FIG. 1 is a diagram schematically illustrating an example of a configuration of a driver evaluation system.

FIG. 1 is a diagram schematically illustrating an example of a configuration of a driver evaluation system 1. The driver evaluation system 1 is an example of a system to evaluate driving of the driver who receives driving support by a drive support device installed in a vehicle, taking a driving support level by the drive support device into account. The driver evaluation system 1 can provide an evaluation result of the driver to an external information service destination such as an insurance company. The driver evaluation system 1 includes an in-vehicle control device 2 installed in a vehicle 11, a server 3 deployed in a center 4, and an insurance company server 5 deployed in an insurance company.

It is assumed that the in-vehicle control device 2 is installed in every vehicle 11 relating to this system. In the following, unless otherwise specified, the in-vehicle control device 2 is installed in an arbitrary one of the vehicles 11. Also, in the following, unless otherwise specified, "the vehicle" refers to a vehicle 11 that has the in-vehicle control device 2 installed, and "the driver" refers to a person driving a vehicle. The vehicle 11 is a subject for collection of probe information such as the vehicle information about the situation of the vehicle 11.

The center 4 is a facility that is located in a remote place from the vehicle 11 having the in-vehicle control device 2 installed. The server 3 deployed in the center 4 can be connected to the in-vehicle control device 2 by using a wireless communication channel. The server 3 can be connected to the insurance company server 5 deployed in the insurance company by using a wired communication channel or a wireless communication channel.

The server 3 includes a vehicle information storage unit 301 and a driver evaluation storage unit 302. The vehicle information storage unit 301 is a database to accumulate the vehicle information to be obtained from each vehicle 11. The driver evaluation storage unit 302 is a database to accumulate evaluation results of driving of the driver of each vehicle 11.

The server 3 can provide the evaluation results of each driver recorded on the driver evaluation storage unit 302 to the insurance company. The insurance company server 5 includes an insurance information storage unit 501. The insurance information storage unit 501 is a database to accumulate the evaluation results of the drivers provided by the server 3. The insurance company uses the evaluation results of the drivers, for example, to calculate the premiums of the drivers.

The evaluation results of the driver are provided to destinations including the vehicle 11, an information providing terminal 6, and an information-service-destination vehicle 7, in addition to the insurance company.

The vehicle 11 includes a communication module 13 and a drive support device 12. The communication module 13 is a device to make a connection to the server 3 by using a wireless communication channel. Once authenticated as the user, an occupant (the driver or a fellow passenger) who receives driving support by the drive support device 12 can obtain the evaluation results of the driver.

The information providing terminal 6 is an example of a device that can connect to the server 3 by using a wireless communication channel, and includes a display on which the evaluation result of the driver can be displayed once the user has been authenticated. Specific examples of the information providing terminal 6 include a smartphone and a tablet terminal.

The information-service-destination vehicle 7 includes a communication module 8, an ECU (Electronic Control Unit) 9, and a navigation device 10. The communication module 8 is an example of a device to make a connection to the server 3 by using a wireless communication channel. The navigation device 10 includes a display on which the evaluation result of the driver can be displayed once the user has been authenticated.

Figure 2:
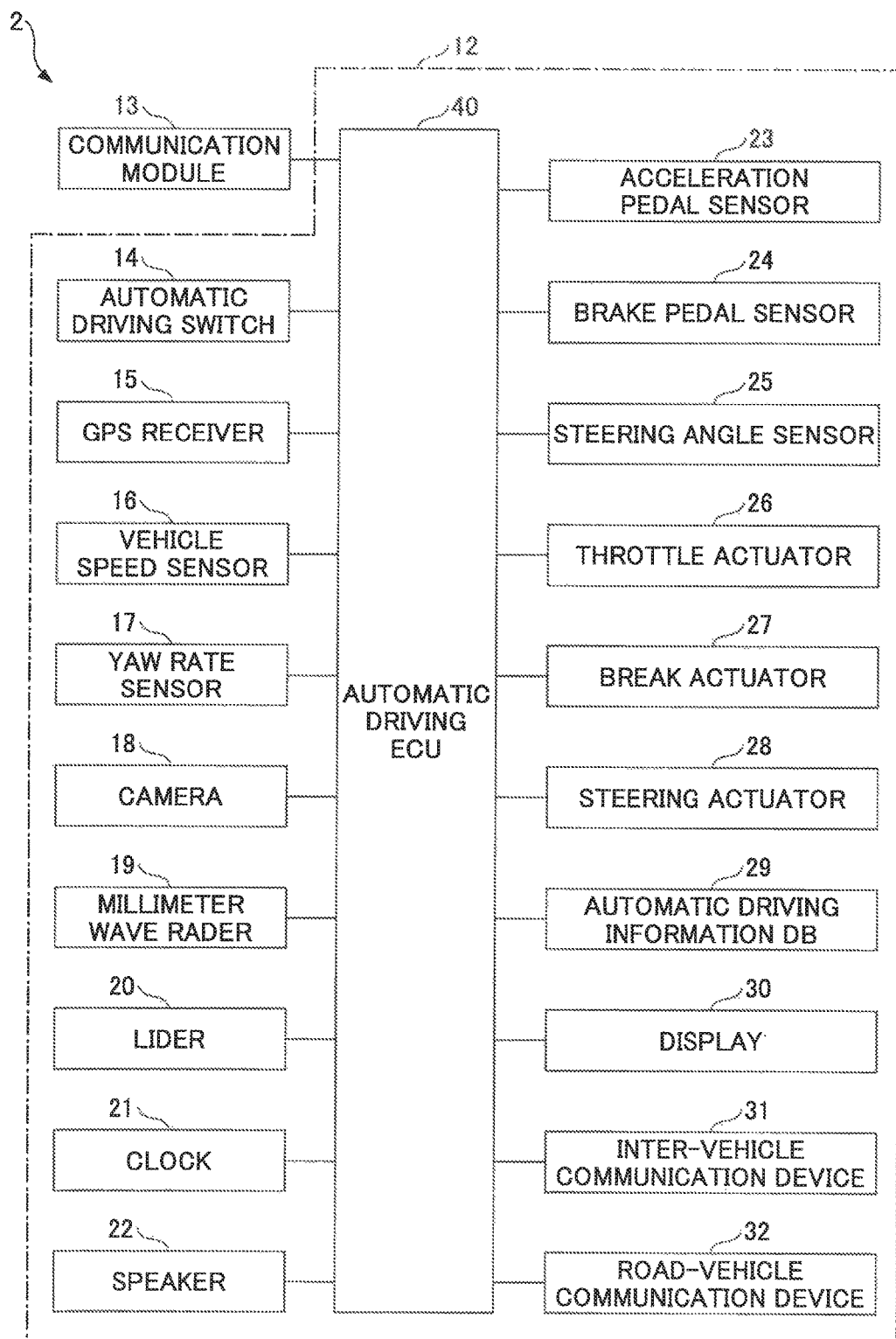
FIG. 2 is a diagram schematically illustrating an example of a hardware configuration of an in-vehicle control device.

FIG. 2 is a diagram schematically illustrating an example of a hardware configuration of the in-vehicle control device 2. The in-vehicle control device 2 includes the communication module 13 and the drive support device 12.

The communication module 13 is an example of a communication unit to connect an automatic driving ECU 40 of the drive support device 12 with the server 3 in the above-mentioned center 4 through a wireless communication channel. The communication module 13 is a transceiver that can execute wireless communication by using, for example, a wireless communication channel for cellular phones.

The drive support device 12 executes drive support for the vehicle. The drive support device 12 includes an automatic driving switch 14, a GPS (Global Positioning System) receiver 15, a vehicle speed sensor 16, a yaw rate sensor 17, a camera 18, a millimeter-wave radar 19, a LIDER (Light Detection and Ranging unit) 20, a clock 21, a speaker 22, an accelerator pedal sensor 23, a brake pedal sensor 24, a steering angle sensor 25, a throttle actuator 26, a brake actuator 27, a steering actuator 28, an automatic driving information DB 29, a display 30, an inter-vehicle communication device 31, a road-vehicle communication device 32, and the automatic driving ECU 40.

The automatic driving switch 14 is a switch that outputs a request level of the driving support for the vehicle requested by the driver, to the automatic driving ECU 40 in response to an operation by the driver. The automatic driving switch 14 outputs, for example, one of five request levels 0-4 as a request level of the driving support.

FIG. 3 is a diagram illustrating an example of driving support levels of the drive support device 12, which summarizes a definition of levels of the automation by NHTSA. The automatic driving switch 14 outputs one of Levels 0-4 as the request level depending on requested contents of the driving support as illustrated in FIG. 3. The greater the number of the level is, the higher the driving support level is. The driving support level represents an automation level of the automatic driving. The higher driving support level is, the higher the automation level is. The driving support level rises stepwise from Level 0 to Level 4. Level 0 represents a state in which there is no support for a driving operation.

FIG. 4 is a diagram illustrating another example of the driving support levels of the drive support device 12. Similar to the above example, the automatic driving switch 14 outputs one of Levels 0-4 as the request level depending on requested contents of the driving support as illustrated in FIG. 4.

Note that the request level output from the automatic driving switch 14 is a level that the driver requests the vehicle to provide. The driving support level of the drive support device 12 is finally determined by the automatic driving ECU 40 depending on the request level from the automatic driving switch 14, detection results of the situation of the vehicle, and the like. The drive support device 12 supports the driving of the vehicle by the driving support contents in accordance with the driving support level determined by the automatic driving ECU 40.

In FIG. 2, the GPS receiver 15 is an example of a vehicle position detector that detects a current position of the vehicle based on radio waves from GPS satellites.

The vehicle speed sensor 16 is an example of a vehicle speed detector that detects the speed of the vehicle.

The yaw rate sensor 17 is an example of a yaw rate detector that detects the yaw rate of the vehicle.

The camera 18 is an example of an image obtaining unit (an image detection unit) that obtains an image around the vehicle including the front direction of the vehicle. The camera 18 may obtain an image of the driver of the vehicle.

The millimeter-wave radar 19 is an example of a distance detector that detects the distance between the vehicle and an object existing around the vehicle (e.g., a preceding vehicle or an obstacle) by transmitting millimeter waves.

The LIDER 20 is an example of a three-dimensional position detector that detects the three-dimensional position of an object existing around the vehicle (e.g., a preceding vehicle or an obstacle).

The clock 21 is an example of a time information output unit (a time detector) that outputs information about the current time.

The speaker 22 is an example of a sound output unit that outputs a sound such as a warning.

The accelerator pedal sensor 23 is an example of an acceleration operation detector that detects the amount of operation of the accelerator pedal operated by the driver of the vehicle.

The brake pedal sensor 24 is an example of a brake operation detector that detects the amount of operation of the brake pedal operated by the driver of the vehicle.

The steering angle sensor 25 is an example of a steering operation detector that detects the amount of operation of the steering operated by the driver of the vehicle.

The throttle actuator 26 is an example of an acceleration amount adjuster that adjusts the amount of acceleration of the vehicle, by driving the throttle of the engine of the vehicle.

The brake actuator 27 is an example of a braking force adjuster that adjusts the braking force of the vehicle.

The steering actuator 28 is an example of a steering angle adjuster that adjusts the steering angle of the tires of the vehicle.

The automatic driving information DB 29 is a database to accumulate map information and the like to be used for the driving support (particularly, for fully automatic driving), which may be referred to as a "dynamic map". The automatic driving information DB 29 accumulates static or dynamic information, for example, three-dimensional road shape information, road regulation information, accident information, weather information, and the like.

The display 30 is an example of a display unit that visually provides information to the occupant such as the driver of the vehicle. The display 30 displays an evaluation result of the driver obtained by a driver evaluation unit of the driver evaluation system 1.

The inter-vehicle communication device 31 is an example of an inter-vehicle communication unit that wirelessly transmits and receives information between the vehicle and another vehicle.

The road-vehicle communication device 32 is an example of a road-vehicle communication unit that wirelessly transmits and receives information between the vehicle and a roadside facility.

The automatic driving ECU 40 is an example of an electronic control unit that controls an operation of the driving support (including the automatic driving) of the vehicle. The automatic driving ECU 40 may include one or more ECUs. If the automatic driving ECU 40 includes multiple ECUs, the ECUs are connected with each other via communication channels of, for example, CAN (Controller Area Network). Although FIG. 2 illustrates the automatic driving ECU 40 and the other units forming one-to-one connections, respectively, the automatic driving ECU 40 and the other units may be connected with each other via communication channels of CAN (Controller Area Network) or the like. Alternatively, the units may be connected with each other without the automatic driving ECU 40 intervening.

Figure 5:
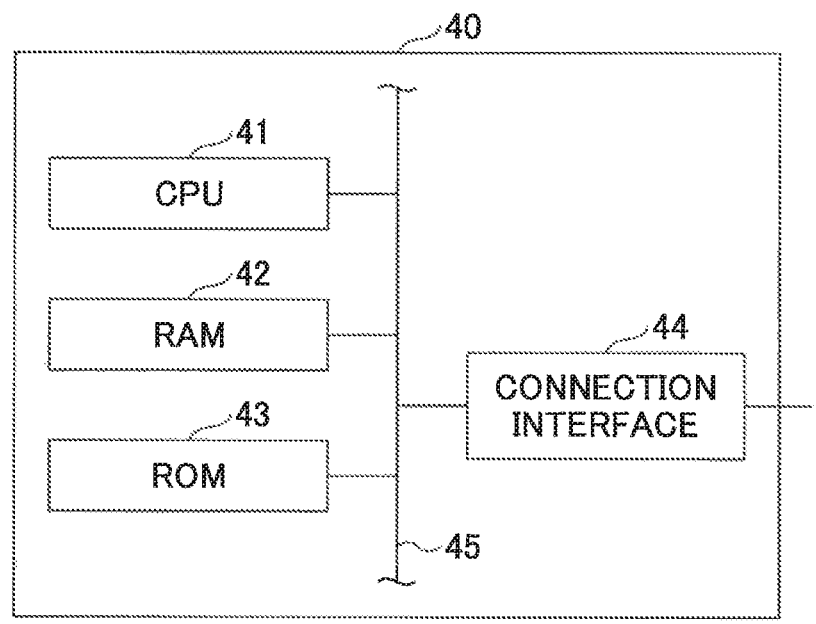
FIG. 5 is a diagram schematically illustrating an example of a hardware configuration of an automatic driving ECU.

FIG. 5 is a diagram schematically illustrating an example of a hardware configuration of the automatic driving ECU 40. The automatic driving ECU 40 includes a CPU (Central Processing Unit) 41, a RAM (Random Access Memory) 42, a ROM (Read-Only Memory) 43, and a connection interface 44. The CPU 41, the RAM 42, the ROM 43, and the connection interface 44 are connected with each other via a bus 45. The automatic driving ECU 40 includes, for example, a microcomputer having the CPU 41, the RAM 42, and the ROM 43 built in. The automatic driving ECU 40 is connected to devices such as the communication module 13, through the connection interface 44.

First Embodiment

Figure 6:
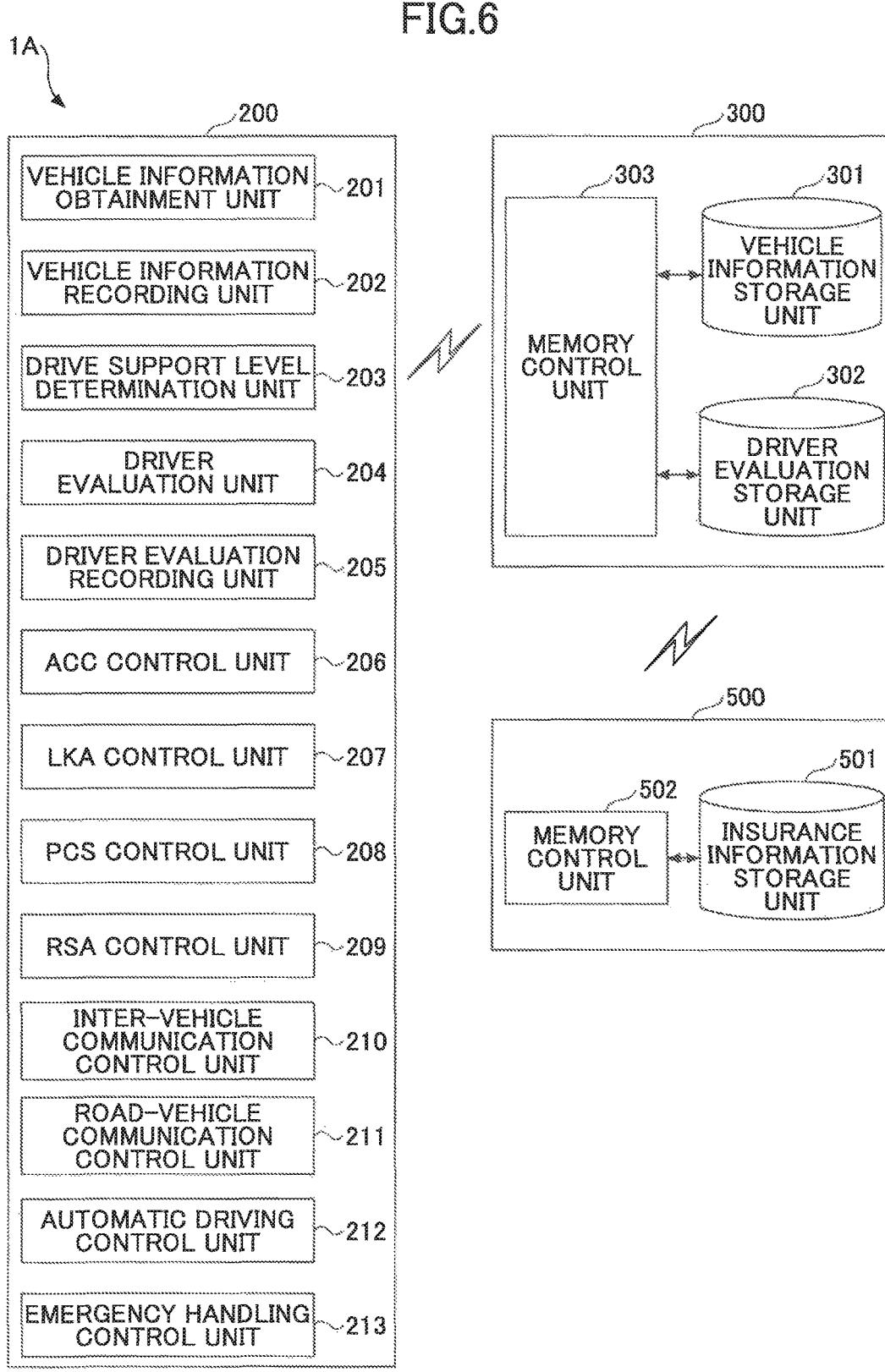
FIG. 6 is a block diagram illustrating an example of a functional configuration of a driver evaluation system according to a first embodiment.

FIG. 6 is a block diagram illustrating an example of a functional configuration of a driver evaluation system 1A according to the first embodiment. The driver evaluation system 1A is an example of the driver evaluation system 1 illustrated in FIG. 1, including an in-vehicle control device 200, a server 300, and an insurance company server 500. The in-vehicle control device 200 is an example of the in-vehicle control device 2, the server 300 is an example of the server 3, and the insurance company server 500 is an example of the insurance company server 5. The in-vehicle control device 200 is an example of a drive support device.

In FIG. 6, the in-vehicle control device 200 includes a vehicle information obtainment unit 201, a vehicle information recording unit 202, a drive support level determination unit 203, a driver evaluation unit 204, a driver evaluation recording unit 205, an ACC (Adaptive Cruise Control) unit 206, an LKA (Lane Keeping Assist) control unit 207, a PCS (Pre-Crash Safety) control unit 208, an RSA (Road Sign Assist) control unit 209, an inter-vehicle communication control unit 210, a road-vehicle communication control unit 211, an automatic driving control unit 212, and an emergency handling control unit 213. These functional units are implemented by the CPU 41 (see FIG. 5) running a program stored in the ROM 43 (see FIG. 5).

On the other hand, the server 300 includes a memory control unit 303, the vehicle information storage unit 301, and the driver evaluation storage unit 302. Since the hardware configuration of the server 300 is substantially the same as the hardware configuration of the automatic driving ECU 40 illustrated in FIG. 5, the illustration is omitted. The memory control unit 303 is implemented by the CPU running a program stored in the ROM. The vehicle information storage unit 301 is a database to accumulate vehicle information transmitted from the in-vehicle control device 200, and the driver evaluation storage unit 302 is a database to accumulate evaluation results of each driver who drives a vehicle having the in-vehicle control device 200 installed.

The insurance company server 500 includes a memory control unit 502 and the insurance information storage unit 501. Since the hardware configuration of the insurance company server 500 is substantially the same as the hardware configuration of the automatic driving ECU 40 illustrated in FIG. 5, the illustration is omitted. The memory control unit 502 is implemented by the CPU running a program stored in the ROM. The insurance information storage unit 501 is a database to accumulate evaluation results provided by the server 300 (driving evaluation results of each driver recorded on the driver evaluation storage unit 302).

The vehicle information obtainment unit 201 is an example of a unit that obtains vehicle information about the situation of the vehicle that includes the driving support level of the drive support device 12 installed in the vehicle, and the position of the vehicle or the time. The vehicle information obtainment unit 201 obtains the driving support level of the drive support device 12 as one of the vehicle information items about the situation of the vehicle. For example, the vehicle information obtainment unit 201 obtains the driving support level from the drive support level determination unit 203.

The drive support level determination unit 203 is an example of a unit that determines the driving support level of the drive support device 12.

An example of the method for determining the driving support level will be described. If one of the ACC control function, the LKA control function, the PCS control function, and the RSA control function is in an enabled state, the drive support level determination unit 203 determines the driving support level as Level 1. If all of the ACC control function, the LKA control function, the PCS control function, and the RSA control function are in enabled states, the drive support level determination unit 203 determines the driving support level as Level 2. If all of the ACC control function, the LKA control function, the PCS control function, the RSA control function, the inter-vehicle communication facility, the road-vehicle-communication function, and the automatic driving function are in enabled states, the drive support level determination unit 203 determines the driving support level as Level 3. If all of the functions for Level 3 and an emergency handling function are in enabled states, the drive support level determination unit 203 determines the driving support level as Level 4.

Here, a "state in which a control function is enabled" means a state in which the control function is turned on; specifically, a state in which the control function is actually activated, or a state in which activation of the control function is permitted. For example, a state in which the PCS control function is enabled is a state in which automatic braking by the PCS control function is actually activated, or a state in which activation of the automatic braking is permitted. A "state in which a control function is not enabled (namely, a disabled state)" means a state in which activation of the control function is inhibited.

For example, the drive support level determination unit 203 refers to operational information representing whether the control function of each control unit is in an enabled state or a disabled state (e.g., a flag), to determine whether the control function is in an enabled state.

The control functions will be briefly described below.

The ACC control function executed by the ACC control unit 206 is one of the driving support functions that makes the vehicle travel following a preceding vehicle while maintaining an appropriate distance between the two vehicles by using the millimeter-wave radar 19 (see FIG. 2) and the like, within a speed range set in advance.

The LKA control function executed by the LKA control unit 207 is one of the driving support functions that makes the vehicle travel along a traffic lane recognized by the camera 18 (see FIG. 2) and the like.

The PCS control function executed by the PCS control unit 208 is one of the driving support functions that senses a collision in advance by the camera 18 and the like to be prepared for the collision for reducing the damage. If having determined that there is a likelihood of a collision, the PCS control function issues a warning from the speaker 22 (see FIG. 2) to prompt the driver to perform a brake operation, or if having determined that the collision is inevitable, activates automatic braking.

The RSA control function executed by the RSA control unit 209 is one of the driving support functions that recognizes a road sign by the camera 18, and informs the driver of the information about the recognized road sign by displaying the information on the display 30 (see FIG. 2).

The inter-vehicle communication function executed by the inter-vehicle communication control unit 210 is one of the driving support functions that controls wirelessly transmitting and receiving information between the vehicle and another vehicle, by using the inter-vehicle communication device 31 (see FIG. 2).

The road-vehicle-communication function executed by the road-vehicle-communication control unit 211 is one of the driving support functions that controls wirelessly transmitting and receiving information between the vehicle and a roadside facility, by using the road-vehicle communication device 32 (see FIG. 2).

The automatic driving function executed by the automatic driving control unit 212 is one of the driving support functions that precisely recognizes the vehicle, another vehicle, a walker, an obstacle, and the like, based on the information provided by the LIDER 20, the automatic driving information DB 29, and the like (see FIG. 2), so as to execute automatic driving in a traveling aspect calculated to obey traffic rules.

The emergency handling function executed by the emergency handling control unit 213 is one of the driving support functions that evaluates risk of executing emergency handling operations if an emergency avoidance or an emergency braking is necessary, and automatically executes an emergency handling operation having the lowest risk.

In FIG. 6, the vehicle information obtainment unit 201 periodically obtains a driving support level identified by a determination by the drive support level determination unit 203, and stores the obtained driving support level in a driving support level storage area in the RAM 42 (see FIG. 5). If a value obtained previous time as the driving support level has been already stored in the driving support level storage area in the RAM 42, the vehicle information obtainment unit 201 updates the driving support level stored in the driving support level storage area in the RAM 42 from the value obtained previous time to a value obtained this time.

Also, the vehicle information obtainment unit 201 periodically obtains the positional information of the vehicle from the GPS receiver 15 (see FIG. 2), and stores the obtained positional information that in a positional information storage area in the RAM 42. If a value obtained previous time as the positional information has been already stored in the positional information storage area in the RAM 42, the vehicle information obtainment unit 201 updates the positional information stored in the positional information storage area in the RAM 42 from the value obtained previous time to a value obtained this time.

Also, the vehicle information obtainment unit 201 periodically obtains time information from the clock 21 (see FIG. 2), and stores the obtained time information in a time information storage area in the RAM 42. If a value obtained previous time as the time information has been already stored in the time information storage area in the RAM 42, the vehicle information obtainment unit 201 updates the time information stored in the time information storage area in the RAM 42 from the value obtained previous time to a value obtained this time.

The vehicle information recording unit 202 is an example of a unit that records the vehicle information obtained by the vehicle information obtainment unit 201 on the vehicle information storage unit 301. The vehicle information recording unit 202 attaches the user ID to the vehicle information obtained by the vehicle information obtainment unit 201, and transmits the information to the server 300 by using the communication module 13 (see FIG. 2). Then, the vehicle information recording unit 202 records the vehicle information obtained by the vehicle information obtainment unit 201 on the vehicle information storage unit 301 through the memory control unit 303.

The user ID is identification information to identify the vehicle, the driver of the vehicle, or the in-vehicle control device 200 installed in the vehicle. The memory control unit 303 receives the vehicle information and the user ID wirelessly transmitted by the vehicle information recording unit 202, and records the received vehicle information on the vehicle information storage unit 301 for each user ID.

The vehicle information recording unit 202 records the position of the vehicle, the time at the position, and the driving support level at the position and the time on the vehicle information storage unit 301. For example, by reading out the information items currently stored in the respective storage areas in the RAM 42, the vehicle information recording unit 202 can obtain the position of the vehicle, the time at the position, and the driving support level at the position and the time. The vehicle information recording unit 202 attaches the user ID to the vehicle information (the position of the vehicle, the time at the position, and the driving support level at the position and the time) obtained by reading out of the respective storage areas in the RAM 42 in this way, and transmits the information to the server 300 by using the communication module 13.

Therefore, the vehicle information recording unit 202 can record the vehicle information (the position of the vehicle, the time at the position, and the driving support level at the position and the time) obtained by reading out of the respective storage areas in the RAM 42, on the vehicle information storage unit 301 through the memory control unit 303. Therefore, by reading out the position of the vehicle, the time at the position, and the driving support level at the position and the time from the vehicle information storage unit 301, it is possible to grasp the position, the time, and the driving support level executed by the drive support device 12 for the driving support.

As a result, for example, it is possible to verify highly precisely in a situation where the drive support device 12 executes the drive support for the vehicle, how much the driver contributes to driving the vehicle even if the degree of contribution of the driver to driving the vehicle changes while the driving support level is maintained at the same level. Also, the vehicle information recording unit 202 associates the time with the driving support level at the time, to store the associated data in the vehicle information storage unit 301. Therefore, it is possible to grasp, for each of the driving support levels, which period in the entire traveling period of the vehicle, the drive support device 12 has executed the drive support.

For example, by reading out the time and the driving support level from the vehicle information storage unit 301, it is possible to grasp, for each of the driving support levels, what time the drive support device 12 has executed the drive support. Specifically, it is possible to identify a driving support level at which the drive support device 12 has executed the driving support in the night. As a result, for example, if the driving support at a comparatively high driving support level is frequently executed during the night, it is possible to verify that the driving support works effectively in the night during which it tends to be difficult for a driver to drive than in the daytime.

For example, by reading out the position and the driving support level at the position from the vehicle information storage unit 301, it is possible to grasp, for each of the driving support levels, at what position the drive support device 12 has executed the drive support. Specifically, it is possible to identify a driving support level that the drive support device 12 has executed on a general road. As a result, for example, if the driving support at a comparatively high driving support level is frequently executed on a general road, it is possible to verify that the driving support works effectively on a general road on which it tends to be difficult for a driver to drive than on a road dedicated for vehicles.

The driver evaluation unit 204 is an example of a unit that evaluates the driving of the driver of the vehicle, based on the vehicle information obtained by the vehicle information obtainment unit 201. For example, the driver evaluation unit 204 calculates an evaluation score for the driving of the driver of the vehicle, based on the vehicle information obtained by the vehicle information obtainment unit 201, following predetermined driving evaluation criteria. The higher the evaluation score is, the higher the evaluation of the driving is. The driver evaluation unit 204 corrects the evaluation score that has been calculated following the predetermined driving evaluation criteria, by adding or deducting points depending on the driving support level of the drive support device 12 and the like, as will be described in detail later. The method for calculating the evaluation score before the correction may be chosen discretionarily, and various well-known technologies are applicable.

The driver evaluation recording unit 205 is an example of a unit that records an evaluation result by the driver evaluation unit 204 on the driver evaluation storage unit 302. The driver evaluation recording unit 205 attaches the user ID to the evaluation result by the driver evaluation unit 204, and transmits the result to the server 300 by using the communication module 13. Then, the driver evaluation recording unit 205 records the evaluation result by the driver evaluation unit 204 on the vehicle information storage unit 301 through the memory control unit 303. The memory control unit 303 receives the evaluation result and the user ID wirelessly transmitted by the driver evaluation recording unit 205, and records the evaluation result on the driver evaluation storage unit 302 for each user ID.

Therefore, the insurance company server 500 can obtain the evaluation result of the driver by reading out the evaluation result by the driver evaluation unit 204 from the driver evaluation storage unit 302. Also, it is possible to provide the evaluation result of the driver to an external information service destination (e.g., an insurance company that provides a service using the evaluation result of the driver), without providing the vehicle information itself about the situation of the vehicle to the external information service destination. Therefore, the privacy can be prevented from leaking out due to providing the vehicle information about the situation of the vehicle to the outside, and the information service can be provided taking the privacy into consideration.

The vehicle information obtainment unit 201 obtains activation information about the emergency avoidance function executed by the drive support device 12 for supporting an emergency avoidance operation of the vehicle. The PCS control function mentioned above is an example of the emergency avoidance function.

The driver evaluation unit 204 downgrades the evaluation of the driving of the driver less in a case where the drive support device 12 has activated the emergency avoidance function at the driving support level being set higher, than in a case where the drive support device 12 has activated the emergency avoidance function at the driving support level being set lower.

The higher the driving support level at which the drive support device 12 executes the drive support, the higher the safety of the vehicle becomes. In other words, activation of the emergency avoidance function at a high level among the driving support levels can be considered as an operation by the drive support device 12 to raise the safety of the vehicle. Therefore, according to this aspect, it is possible to prevent that the evaluation of the driver unfairly falls down by activation of the emergency avoidance function at a high level among the driving support levels.

Figure 7:
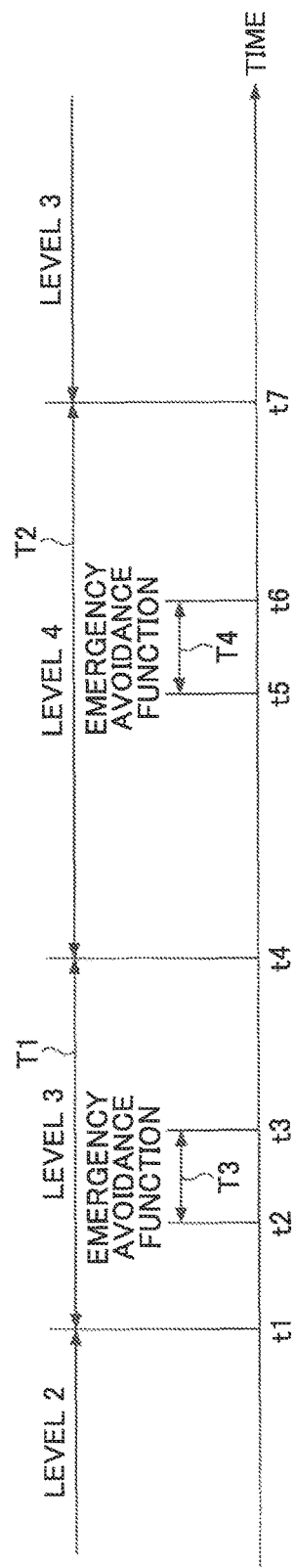
FIG. 7 is a timing chart illustrating an example of a relationship between driving support levels and activation of an emergency control function.

FIG. 7 is a timing chart illustrating an example of a relationship between the driving support levels and activation of the emergency control function. The drive support device 12 executes the drive support at Level 3 among the driving support levels in a period T1 (t1-t4), and executes the driving support at Level 4 among the driving support levels in a period T2 (t4-t7). The drive support device 12 activates the emergency avoidance function in a T3 (t2-t3) within the period T1, and activates the emergency avoidance function in a T4 (t5-t6) within the period T2.

The driver evaluation unit 204 downgrades the evaluation of the driving of the driver less in the case where the drive support device 12 activates the emergency avoidance function while the driving support level is Level 4, than in the case where the drive support device 12 activates the emergency avoidance function while the driving support level is Level 3.

For example, the driver evaluation unit 204 does not deduct a point from the evaluation score of the driver if the drive support device 12 activates the emergency avoidance function while the driving support level is Level 4, but deducts a point from the evaluation score of the driver if the drive support device 12 activates the emergency avoidance function while the driving support level is Level 3. Alternatively, the driver evaluation unit 204 deducts fewer points from the evaluation score of the driver in the case where the drive support device 12 activates the emergency avoidance function while the driving support level is Level 4, than in the case where the drive support device 12 activates the emergency avoidance function while the driving support level is Level 3.

Also, the driver evaluation unit 204 evaluates higher the driving of the driver while the drive support device executes the driving support for the vehicle at a driving support level greater than or equal to a predetermined level for a period of time, in a case where the period of time is longer than in a case where the period of time is shorter.

In a situation where the drive support device 12 executes driving support for the vehicle at a predetermined level or higher among the driving support levels, the safety of the vehicle tends to be higher if the period of time is longer during which the driver transfers command of driving the vehicle to the drive support device 12. Therefore, according to this aspect, it is possible to properly evaluate the driving of the driver who transfers command of driving the vehicle to the drive support device 12 that executes the driving support for the vehicle at the predetermined level or higher among the driving support levels. Also according to this aspect, it is possible to properly evaluate the driving of the driver, without continuing to record all information items of the vehicle for evaluating the driving of the driver. In other words, it is possible to avoid the necessary amount of information becoming enormous for an appropriate evaluation of the driving of the driver, and to reduce the necessary capacity of the storage device.

For example, in FIG. 7, the driver evaluation unit 204 evaluates the driving of the driver higher if the period T2 during which the drive support device 12 executes the driving support for the vehicle at Level 4 is longer than the period T1 during which the drive support device 12 executes the driving support for the vehicle at Level 3. For example, the driver evaluation unit 204 adds more points to the evaluation score of the driver in the period T2 than points to be added in the period T1.

Figure 8:
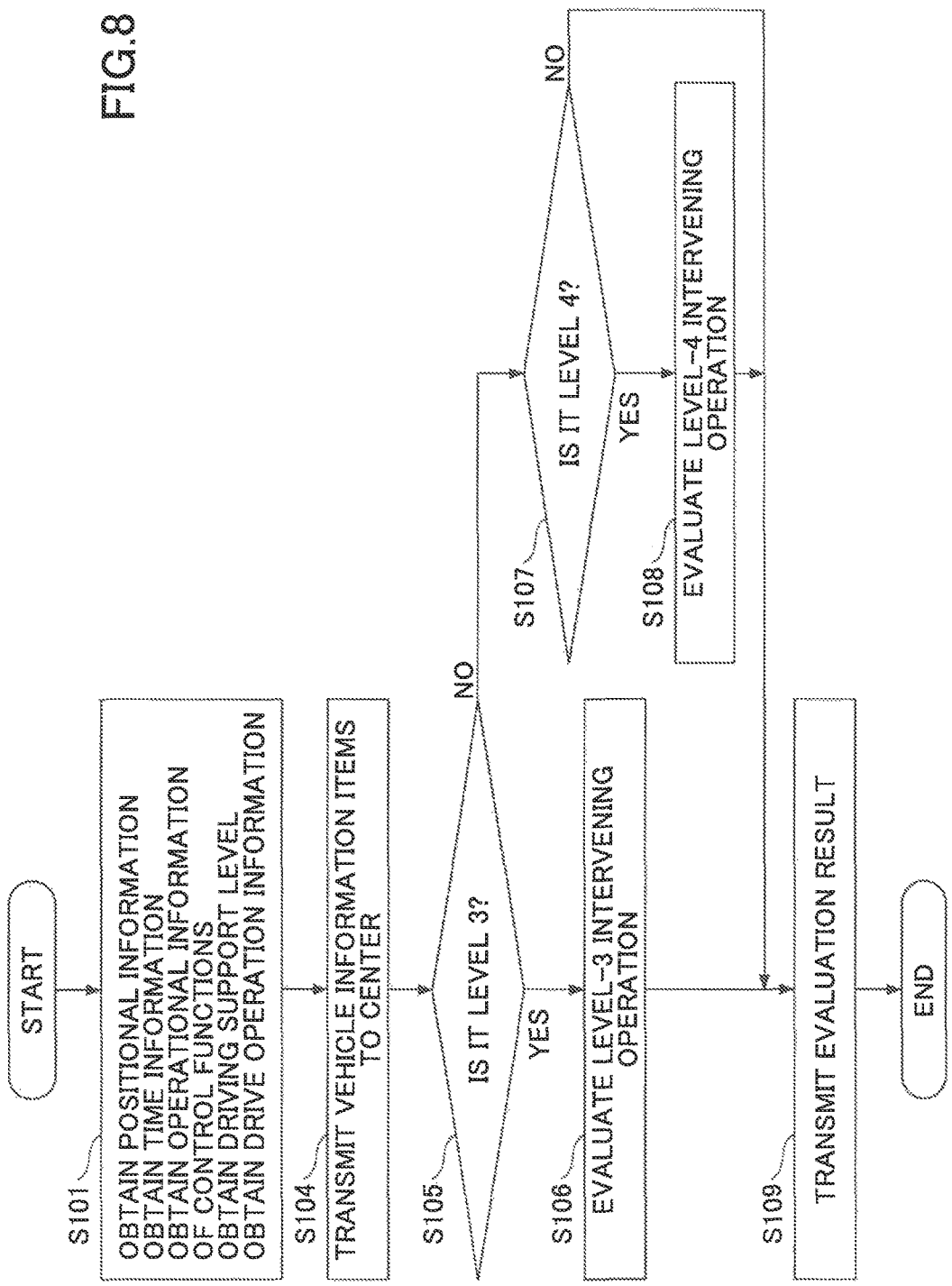
FIG. 8 is a flowchart illustrating an example of operations of an in-vehicle control device according to the first embodiment.

FIG. 8 is a flowchart illustrating an example of operations of the in-vehicle control device 2. The in-vehicle control device 2 repeats the process from the start to the end periodically.

At Step S101, the vehicle information recording unit 202 reads and obtains various vehicle information items currently stored in the respective storage areas in the RAM 42.

At Step S101, the vehicle information recording unit 202 also reads and obtains the positional information of the vehicle from the positional information storage area in the RAM 42, and reads and obtains the time information of the vehicle from the time information storage area in the RAM 42.

At Step S101, the vehicle information recording unit 202 also reads and obtains the operation information representing whether the control function of each of the control units 206-213 is in an enabled state or a disabled state, from each of the operational information storage areas in the RAM 42. Each of the operational information storage areas in the RAM 42 stores each of the operational information items that are periodically obtained by the vehicle information obtainment unit 201 from each of the control units 206-213. If a value obtained previous time as the operational information item has been already stored in the operational information storage area in the RAM 42, the vehicle information obtainment unit 201 updates the operational information item stored in the operational information storage area in the RAM 42 from the value obtained previous time to a value obtained this time.

At Step S101, the vehicle information recording unit 202 also reads and obtains the driving support level from the driving support level storage area in the RAM 42.

At Step S101, the vehicle information recording unit 202 also reads and obtains the information items about a driving operation by the driver of the vehicle from the driving operation information areas in the RAM 42. Each of the driving operation information areas in the RAM 42 stores each of the driving operation information items that are periodically obtained by the vehicle information obtainment unit 201 from the corresponding sensor (a detector such as the brake pedal sensor 24 or the like illustrated in FIG. 2). If a value obtained previous time as the driving operation information item has been already stored in the driving operation information storage area in the RAM 42, the vehicle information obtainment unit 201 updates the driving operation information item stored in the driving operation information storage area in the RAM 42 from the value obtained previous time to a value obtained this time.

At Step S104, the vehicle information recording unit 202 attaches the user ID to the various vehicle information items obtained at Step S101 almost simultaneously, and transmits the information to the server 300 by using the communication module 13.

At Steps S105-S108, the driver evaluation unit 204 evaluates the driving of the driver of the vehicle, based on the driving support level and the driving operation information obtained at Step S101. Depending on the driving support level, the driver may need or may not need to perform an intervening operation. Therefore, the driver evaluation unit 204 evaluates the driving of the driver based on the driving support level and the driving operation information, so as to evaluate whether it is appropriate to have the driver perform an intervening operation in the driving support by the drive support device. FIG. 8 illustrates an example where Level 3 represents a level that requires an intervening operation in the driving support of the drive support device 12, and Level 4 represents a level that does not require an intervening operation in the driving support of the drive support device 12.

At Step S105, the driver evaluation unit 204 determines whether the driving support level obtained at Step S101 is Level 3. If having determined that the driving support level is Level 3, the driver evaluation unit 204 executes Step S106 to evaluate the intervening operation of the driver; or if having determined that the driving support level is not Level 3, executes a determination process at Step S107.

At Step S106, the driver evaluation unit 204 evaluates the intervening operation in the case of the driving support level being Level 3. In the case of the driving support level being Level 3, based on the driving operation information obtained at Step S101, the driver evaluation unit 204 evaluates the driving of the driver higher in a case where there is a driving operation by the driver than in a case where there is no driving operation by the driver. For example, the driver evaluation unit 204 does not add a point to the evaluation score of the driver if there is no driving operation by the driver, but adds a point if there is a driving operation by the driver. Alternatively, the driver evaluation unit 204 adds more points to the evaluation score of the driver in the case where there is a driving operation by the driver than in the case where there is no driving operation by the driver.

The driver evaluation unit 204 evaluates the driving of the driver higher, for example, if the driver performs a brake operation after the TTC (Time To Collision) has become a predetermined value or less; if the driver performs a steering operation after an obstacle to be avoided by a steering operation has been recognized; or if the driver performs a manual driving operation within a predetermined time after notice of information has been made about switching to the manual driving. Note that the TTC is a value obtained by dividing the distance between a preceding vehicle and the vehicle by the relative speed.

As such, by Step S106, the driver is evaluated higher if the driver performs a driving operation when the drive support device 12 executes the driving support at a lower driving support level (Level 3) that necessitates a driving operation by the driver. Therefore, it is possible to prompt the driver to perform an intervening operation.

At Step S107, the driver evaluation unit 204 determines whether the driving support level obtained at Step S101 is Level 4. If having determined that the driving support level as Level 4, the driver evaluation unit 204 executes the intervening operation evaluation of the driver at Step S108; or if having determined that the driving support level is not Level 4, determines that it is not necessary to execute the intervening operation evaluation of the driver.

At Step S108, the driver evaluation unit 204 executes the intervening operation evaluation of the driver in the case of the driving support level being Level 4. In the case of the driving support level being Level 4, based on the driving operation information obtained at Step S101, the driver evaluation unit 204 evaluates the driving of the driver higher in the case where the driver performs the driving operation than in the case where the driver does not perform the driving operation. For example, the driver evaluation unit 204 does not add a point to the evaluation score of the driver if there is a driving operation by the driver, but adds a point if there is no driving operation by the driver. Alternatively, the driver evaluation unit 204 adds more points to the evaluation score of the driver in the case where there is a driving operation by the driver than in the case where there is no driving operation by the driver.

The driver evaluation unit 204 evaluates the driving of the driver lower, for example, if the driver performs an acceleration operation after the TTC (Time To Collision) has become a predetermined value or less and the automatic braking has been executed; if the driver performs a steering operation in a direction hindering the automatic steering operation after an obstacle to be avoided by the steering operation has been recognized; or if the driver performs a manual driving operation forcibly without having performed a switching operation to the manual driving even if notice of information has not been made about switching to the manual driving.

As such, by Step S108, when the drive support device 12 executes the driving support at a driving support level that does not require a driving operation by the driver, the driver evaluation unit 204 evaluates the driving of the driver higher in the case where the driver does not perform a driving operation than in the case where the driver performs a driving operation. Therefore, it is possible to prevent the driver from performing an intervening operation unnecessarily if the drive support device 12 executes the driving support at a driving support level that does not require a driving operation by the driver (Level 4).

At Step S109, the driver evaluation recording unit 205 attaches the user ID to the evaluation result by the driver evaluation unit 204, and transmits the information to the server 300 by using the communication module 13. Note that various vehicle information items transmitted at Step S104 may be transmitted at Step S109.

Figure 9:
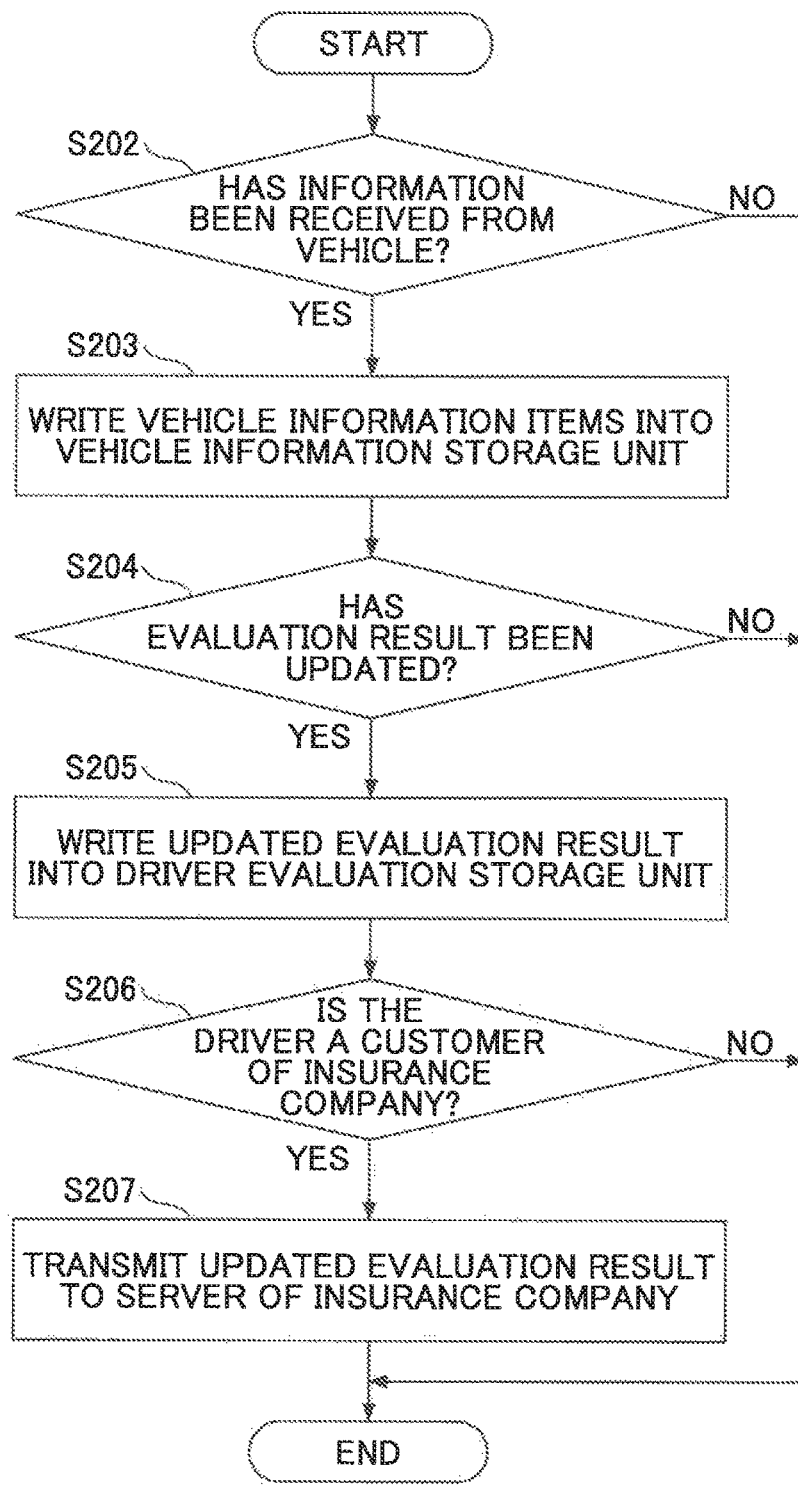
FIG. 9 is a flowchart illustrating an example of operations of a server at a center according to the first embodiment.

FIG. 9 is a flowchart illustrating an example of operations of the server 300. The server 300 repeats the process from the start to the end periodically.

At Step S202, the memory control unit 303 determines whether the information has been received from the in-vehicle control device 200 of the vehicle. If the information has been received, Step S203 is executed.

At Step S203, the memory control unit 303 writes the various vehicle information items from the in-vehicle control device 200 in the vehicle information storage unit 301.

At Step S204, the memory control unit 303 determines whether the evaluation result of the driver from the in-vehicle control device 200 has been updated from the previous evaluation result. If there is an update, Step S205 is executed.

At Step S205, the memory control unit 303 writes the evaluation result of the driver in the driver evaluation storage unit 302 for each user ID.

At Step S206, the memory control unit 303 determines whether the driver is a customer of the insurance company. If the driver is a customer, Step S207 is executed.

At Step S207, the memory control unit 303 transmits the updated evaluation result to the insurance company server 5. This updates information in the insurance information storage unit 501 of the insurance company server 5.

Second Embodiment

Figure 10:
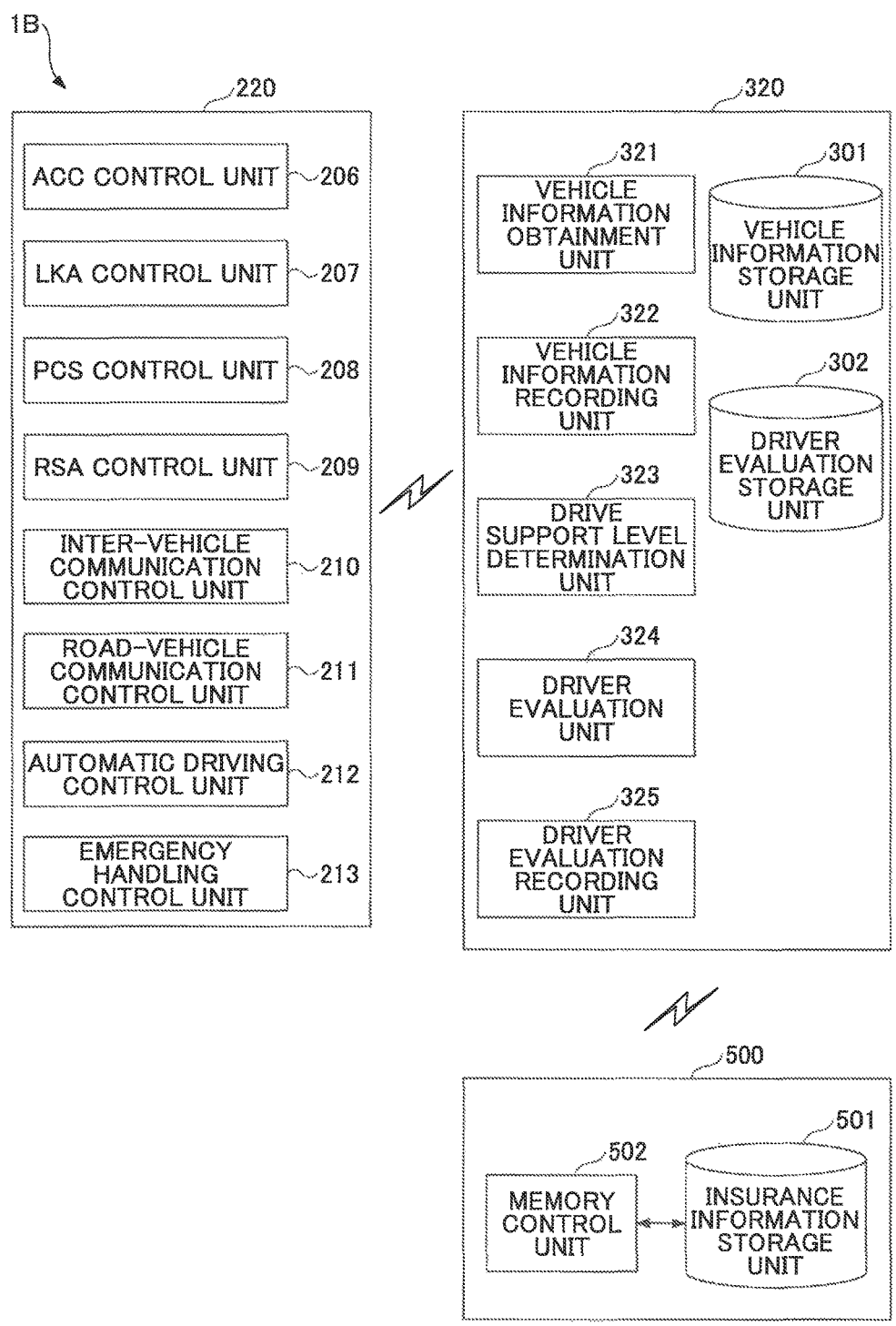
FIG. 10 is a diagram schematically illustrating an example of a configuration of a driver evaluation system.

FIG. 10 is a block diagram illustrating an example of a functional configuration of a driver evaluation system 1B according to the second embodiment. The driver evaluation system 1B is an example of the driver evaluation system 1 illustrated in FIG. 1, including an in-vehicle control device 220, a server 320, and the insurance company server 500. The in-vehicle control device 220 is an example of the in-vehicle control device 2, and the server 320 is an example of the server 3, and the insurance company server 500 is an example of the insurance company server 5. The server 320 is an example of a drive support device.

The second embodiment differs from the first embodiment in FIG. 6 such that the vehicle information obtainment unit, the vehicle information recording unit, the drive support level determination unit, the driver evaluation unit, and the driver evaluation recording unit are deployed on the server instead of the in-vehicle control device. The second embodiment will be described mainly about the points different from those in the first embodiment. As for virtually the same points as in the first embodiment, the description in the first embodiment may be referred to and may be omitted here.

A vehicle information obtainment unit 321 wirelessly communicates with the in-vehicle control device 220, to obtain the vehicle information about the situation of the vehicle having the in-vehicle control device 220 installed along with the user ID.

Through the wireless communication with the in-vehicle control device 220, a drive support level determination unit 323 obtains operational information that represents whether the state of the control function of each of the control units 206-213 is enabled or disabled (e.g., a flag) along with the user ID, to determine whether each of the control functions is in an enabled state.

The vehicle information obtainment unit 321 periodically obtains a driving support level identified by a determination by the drive support level determination unit 323, and stores the obtained driving support level in a driving support level storage area in the RAM of the server 320. This is the same for other information items about the vehicle.

A vehicle information recording unit 322 records the vehicle information obtained by the vehicle information obtainment unit 321 in the vehicle information storage unit 301 for each user ID.

A driver evaluation unit 324 evaluates the driving of the driver of the vehicle having the in-vehicle control device 220 installed, based on the vehicle information obtained by the vehicle information obtainment unit 321. A driver evaluation recording unit 325 records an evaluation result by the driver evaluation unit 324 on the driver evaluation storage unit 302 for each user ID.

Third Embodiment

Figure 11:
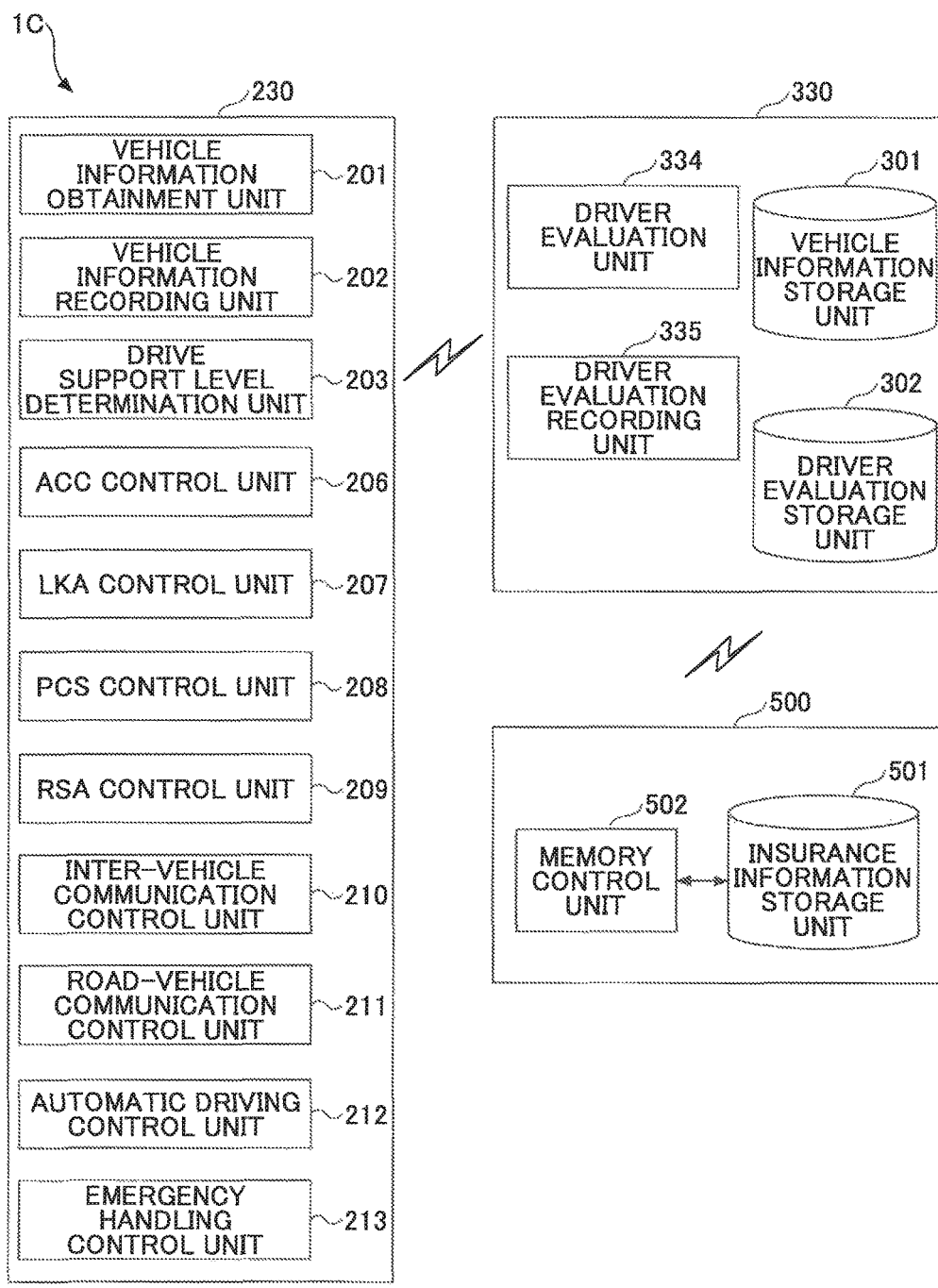
FIG. 11 is a diagram schematically illustrating an example of a configuration of a driver evaluation system.

FIG. 11 is a block diagram illustrating an example of a functional configuration of a driver evaluation system 1C according to the third embodiment. The driver evaluation system 1C is an example of the driver evaluation system 1 illustrated in FIG. 1, including an in-vehicle control device 230, a server 330, and the insurance company server 500. The in-vehicle control device 230 is an example of the in-vehicle control device 2, the server 330 is an example of the server 3, and the insurance company server 500 is an example of the insurance company server 5. The in-vehicle control device 230 is an example of a drive support device.

The third embodiment differs from the first embodiment in FIG. 6 such that the driver evaluation unit and the driver evaluation recording unit are deployed on the server instead of the in-vehicle control device. The third embodiment will be described mainly about the points different from those in the first embodiment. As for virtually the same points as in the first embodiment, the description in the first embodiment may be referred to and may be omitted here.

A driver evaluation unit 334 evaluates the driving of the driver of the vehicle having the in-vehicle control device 230 installed, based on the vehicle information obtained by the vehicle information obtainment unit 201. Through the wireless communication with the in-vehicle control device 230, the driver evaluation unit 334 obtains the vehicle information obtained by the vehicle information obtainment unit 201 along with the user ID. A driver evaluation recording unit 335 records an evaluation result by the driver evaluation unit 334 on the driver evaluation storage unit 302 for each user ID.

So far, the drive support device has been described with the embodiments. Note that the present invention is not limited to the above embodiments. Various modifications and improvements can be made within the scope of the present invention, by combining and/or replacing a part of or all of the embodiments with the others.

For example, both the positional information and the time information of the vehicle may not be recorded on the vehicle information storage unit, but only one of the positional information and the time information of the vehicle may be recorded on the vehicle information storage unit.

For example, the driving support levels illustrated in FIGS. 3 and 4 are just examples. The driving support levels just need to be specified in stages in terms of the support degrees of the driving support, which may be classified in more detail or much simplified. Also, the contents of the driving support assigned to the respective driving support levels are also examples.

The invention claimed is:

1. A drive support device comprising:
a plurality of control units configured to execute driving support functions by the drive support device on a vehicle;
a memory storing vehicle information;
an electronic control unit operatively coupled to the memory and the plurality of control units, the electronic control unit being configured to:
periodically receive and store, in the memory, vehicle information of the vehicle and a corresponding position of the vehicle or a time of receiving the vehicle information;
determine one of a plurality of driving support levels enabled by the drive support device installed in the vehicle, the one of the plurality of driving support levels being determined based on which of the plurality of control units is in an enabled state;
control the drive support device to execute at least one of the plurality of driving support functions on the vehicle;
in response to the drive support device executing the at least one of the plurality of driving support functions on the vehicle, receive and store, in the memory, a current position of the vehicle or a current time, in association with the determined driving support level at the current position of the vehicle or at the current time; and
evaluate driving of a driver of the vehicle by determining an evaluation score of the driver of the vehicle by assigning a value based on the determined driving support level, the executed at least one of the plurality of driving support functions at the current position or the current time, and a driving operation performed by the driver on the vehicle at the current position or the current time.

2. The drive support device as claimed in claim 1, wherein the electronic control unit is configured to:
store the evaluation score of the driver in the memory.

3. The drive support device as claimed in claim 2, wherein the vehicle information includes a situation of the vehicle, other than the position of the vehicle or the time of receiving the vehicle information, and the determined driving support level.

4. The drive support device as claimed in claim 2, wherein:
the received vehicle information includes activation information about an emergency avoidance function executed by the drive support device for supporting an emergency avoidance operation of the vehicle,
the electronic control unit is configured to decrease the evaluation score of the driving of the driver less when the drive support device executing the emergency avoidance function at the driving support level that is set higher than when the drive support device executes the emergency avoidance function at the driving support level that is set lower.

5. The drive support device as claimed in claim 2, wherein the electronic control unit is configured to increase the evaluation score of the driving of the driver when the drive support device executes driving support on the vehicle at the driving support level greater than or equal to a predetermined level for a period of time, in a case where the period of time is longer than in a case where the period of time is shorter.

6. The drive support device as claimed in claim 2, wherein the received vehicle information includes information about the driving operation performed by the driver of the vehicle.

7. The drive support device as claimed in claim 6, wherein when the driving support level is set to a level requiring the driving operation by the driver, the electronic control unit is configured to increase the evaluation score of the driving of the driver in a case where the driver performs the driving operation as compared to a case where the driver does not perform the driving operation.

8. The drive support device as claimed in claim 6, wherein when the driving support level is set to a level not requiring the driving operation by the driver, the electronic control unit is configured to increase the evaluation score of the driving of the driver in a case where the driver does not perform the driving operation as compared to a case where the driver performs the driving operation.

9. The drive support device as claimed in claim 7, wherein when the driving support level is set to a level not requiring the driving operation by the driver, the electronic control unit is configured to increase the evaluation score of the driving of the driver in a case where the driver does not perform the driving operation as compared to a case where the driver performs the driving operation.

* * * * *